United States Patent
Hogwood

(10) Patent No.: US 11,875,423 B2
(45) Date of Patent: Jan. 16, 2024

(54) PLATFORM FOR WAGERING ON SPORTING EVENTS

(71) Applicant: William E. Hogwood, Boca Raton, FL (US)

(72) Inventor: William E. Hogwood, Boca Raton, FL (US)

(73) Assignee: GAMEDAYMATCH LLC, Boca Raton, FL (US)

( * ) Notice: Subject to any disclaimer, the term of this patent is extended or adjusted under 35 U.S.C. 154(b) by 67 days.

(21) Appl. No.: 17/230,486

(22) Filed: Apr. 14, 2021

(65) Prior Publication Data

US 2021/0319531 A1 Oct. 14, 2021

Related U.S. Application Data

(60) Provisional application No. 63/009,760, filed on Apr. 14, 2020.

(51) Int. Cl.
*G06Q 50/34* (2012.01)
*G06F 17/11* (2006.01)
*G07F 17/32* (2006.01)

(52) U.S. Cl.
CPC ............ *G06Q 50/34* (2013.01); *G06F 17/11* (2013.01); *G07F 17/3244* (2013.01); *G07F 17/3288* (2013.01)

(58) Field of Classification Search
CPC ..... G06Q 50/34; G06F 17/11; G07F 17/3244; G07F 17/3288
USPC ........................................................ 463/25
See application file for complete search history.

(56) References Cited

U.S. PATENT DOCUMENTS

| | | | |
|---|---|---|---|
| 10,926,183 B2* | 2/2021 | Covington | G06N 7/01 |
| 2011/0039621 A1* | 2/2011 | Steene | G07F 17/32 463/43 |
| 2011/0098105 A1* | 4/2011 | Ryan | G07F 17/32 463/25 |
| 2012/0115585 A1* | 5/2012 | Goldman | G07F 17/3272 463/25 |
| 2013/0267326 A1* | 10/2013 | Froy, Jr. | G07F 17/3241 463/42 |
| 2016/0086441 A1* | 3/2016 | Cohen | G07F 17/3288 463/25 |
| 2017/0193736 A1* | 7/2017 | Martino | G07F 17/329 |
| 2019/0130694 A1* | 5/2019 | Saulino | G07F 17/323 |
| 2020/0294365 A1* | 9/2020 | Moskowitz | G07F 17/3288 |

* cited by examiner

*Primary Examiner* — Ronald Laneau
(74) *Attorney, Agent, or Firm* — Blank Rome LLP

(57) ABSTRACT

A platform for wagering on sporting events that includes two novel features that may be implemented separately or in combination. First, by selecting the outcome of a number of sporting events, the participant is in effect wagering on the outcome of each selected sporting event individually and each combination of the selected sporting events. Secondly, point spreads may be listed as whole integers (or even a range), creating the possibility that the outcome of the sporting event will match the point spread exactly. Participants are therefore given the option to select that the outcome of the sporting event will match the point spread exactly (sometimes referred to as a "push"), increasing the odds of a correct prediction and increasing the potential payout.

9 Claims, 4 Drawing Sheets

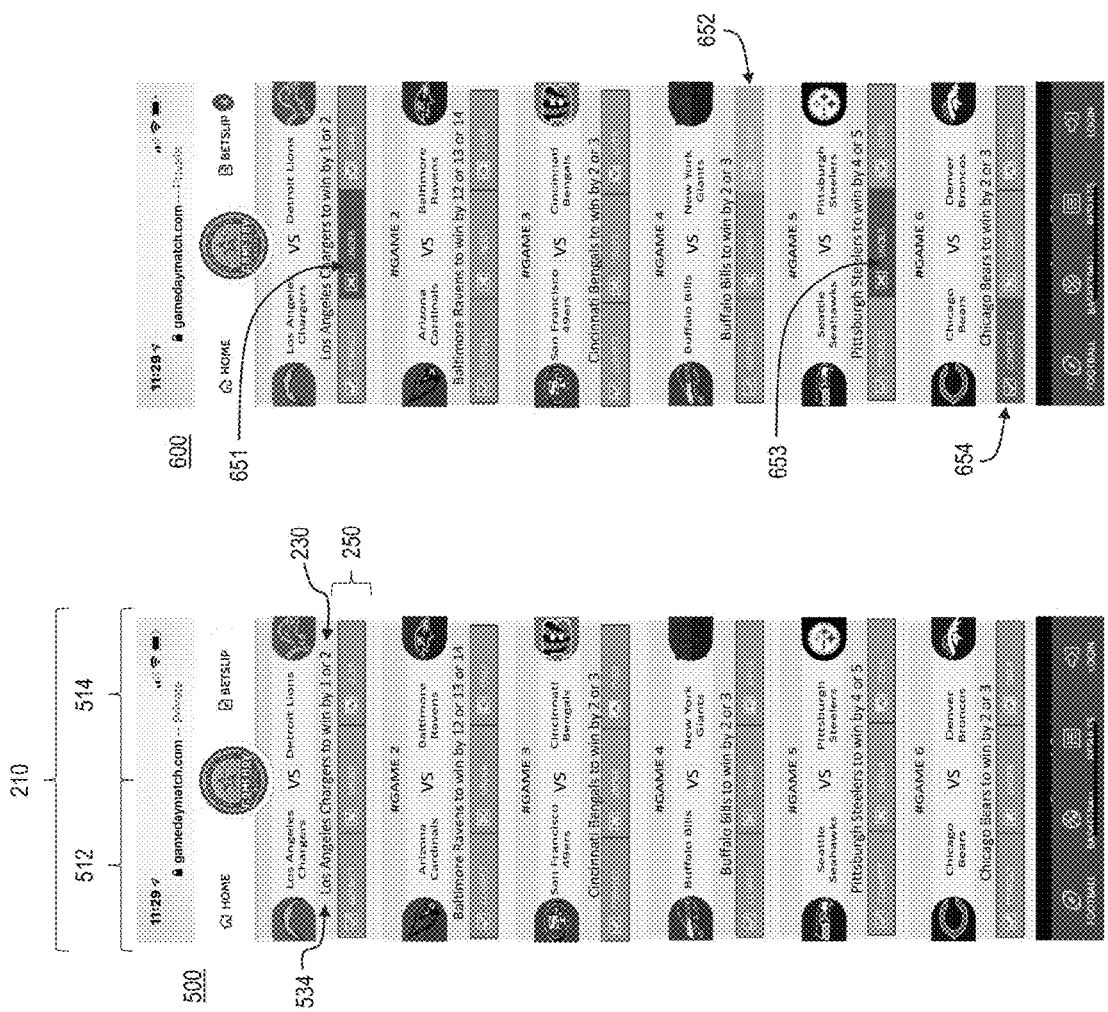

PLATFORM FOR WAGERING ON SPORTING EVENTS

CROSS-REFERENCE TO RELATED APPLICATIONS

This application claims priority to U.S. Prov. Pat. Appl. No. 63/009,760, filed Apr. 14, 2020, which is hereby incorporated by reference.

BACKGROUND

In the area of sports wagering, gamblers are interested in new ways to wager on the outcomes of sporting events. Of particular interest are wagers on lower probably events that offer the possibility of larger payouts. A typical sports wager is that either a team that is favored to win ("the favorite") will win the game by more than a point spread or the team that is not favored ("the underdog") will win the game outright or keep the score differential from exceeding the point spread. Point spreads typically include a half-point, meaning that either the favorite or the underdog will win the game relative to the point spread. If the point spread is an integer and the outcome of the sporting event matches the point spread exactly (often called a "push"), the stakes are returned.

Gamblers can make lower probability wagers by making what is called a "parlay," where they predict the outcome of two or more sporting events. The payout for winning a parlay are higher than a wager on the outcome of a single game. However, the odds of winning a parlay are lower because the gambler has to predict all of the sporting events correctly. Gamblers can create the possibility of a large payout by making a many-game parlay while also increasing their odds of winning some small amount by wagering on each sporting event in the parlay individually or in smaller parlays. However, making all of those combinations requires knowledge that a casual sports fan may not possess and time that a casual sports fan may not wish to devote.

SUMMARY

In order to overcome those and other drawbacks of the prior art, a platform for wagering on sporting events that includes two novel features that may be implemented separately or in combination.

First, by selecting the outcome of a number of sporting events, the participant is in effect wagering on the outcome of each selected sporting event individually and each combination of the selected sporting events. Secondly, point spreads may be listed as whole integers (or even a range), creating the possibility that the outcome of the sporting event will match the point spread exactly. Participants are therefore given the option to select that the outcome of the sporting event will match the point spread exactly (sometimes referred to as a "push"), increasing the odds of a correct prediction and increasing the potential payout.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

FIG. 5 is a schedule view output via the client user interface according to an exemplary embodiment.

FIG. 6 is a user selection view output via the client user interface according to an exemplary embodiment.

DETAILED DESCRIPTION

Figure 1:
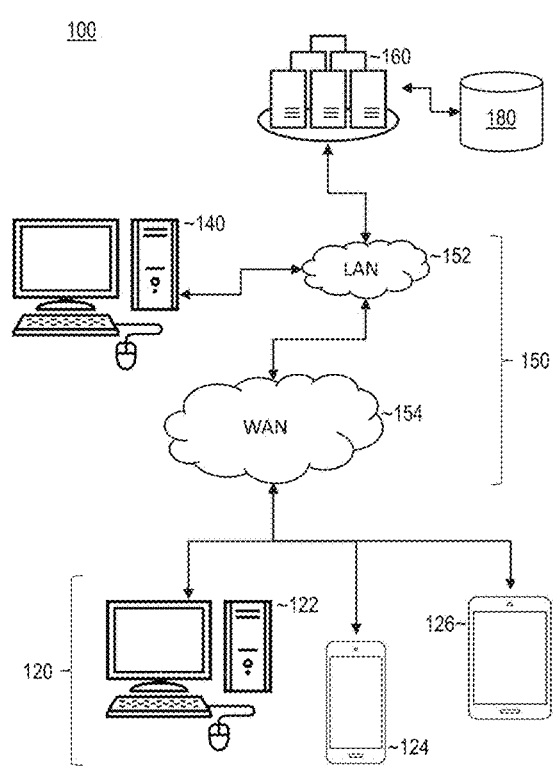
FIG. 1 is a diagram of an architecture of a system for wagering on sporting events according to an exemplary embodiment.

Reference to the drawings illustrating various views of exemplary embodiments is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 is a diagram of an architecture 100 of a system for wagering on sporting events according to an exemplary embodiment.

As shown in FIG. 1, the architecture 100 includes a server 160 that communicates with client devices 120 via one or more networks 150. The server 160 may be in communication with computer readable storage media 180 via a wired connection, via one or more of the networks 150, etc. The server 160 may also be in communication with an operator interface 140 via a wired connection, via one or more of the networks 150, etc.

The server 160 may include any suitable computing device that executes instructions to perform the functions described herein. The server 160 may include, for example, a web server that provides a user interface that is accessible by the client devices 120 using a web browser. Additionally or alternatively, the server 160 may include an application server that makes software executed by the server 160 accessible to a software program executed by the client devices 120. The application server may be a mobile application server that makes software executed by the server 160 accessible to a mobile application running executed by the client devices 120.

The networks 150 may include local area networks 152, wide area networks 154 (e.g., the Internet), etc.

The computer readable storage media 180 may include any non-transitory hardware storage medium, such as a hard disk, solid-state memory, etc.

The client devices 120 may include any suitable computing device that executes instructions to send and receive data to/from the server 160 and provides a graphical user interface to receive instructions from a user and display information to that user. The remote computing devices 120 may include (desktop or notebook) personal computers 122, smartphones 124, and tablet computers 126. Similarly, the operator interface terminal 140 may be any suitable computing device that executes instructions to send and receive data to/from the server 160 and provides a graphical user interface to receive instructions from an operator and display information to that operator.

The client devices 120 may be co-located with the server 120 and/or the operator interface terminal 140, for example at a licensed sports wagering venue (commonly referred to as a "sportsbook"). In those instances, the client devices 120 may communicate with the server 120 and/or the operator interface terminal 140 via a local area network 152. In other embodiments, the client devices 120 may communicate with the server 120 and/or the operator interface terminal 140 via a wide area network 154, for example the Internet.

Figure 2:
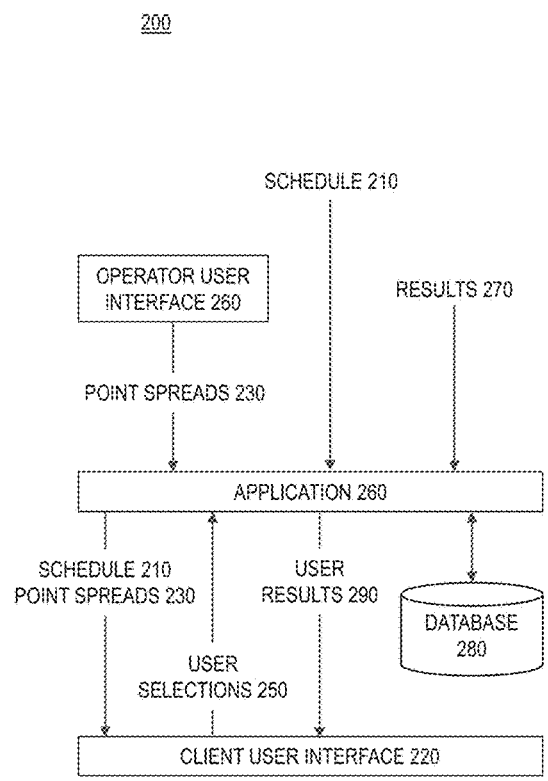
FIG. 2 is a block diagram of the system for wagering on sporting events according to an exemplary embodiment.

FIG. 2 is a block diagram of the system 200 for wagering on sporting events according to an exemplary embodiment.

As shown in FIG. 2, the system 200 includes a software application 260, which may be executed by the server 160, and a database 280, which may be stored on the computer readable storage media 180. The system 200 also includes an operator user interface 260 that provides functionality for an operator to view the schedule 210 of sporting events an input a point spread 230 for each sporting event. The operator user interface 260 may be provided to the operator interface terminal 140. The system 200 also includes a client user interface 220 that provides functionality for users to view the schedule 210 of sporting events and the point spread 230 for each sporting event and input user selections 250. The operator user interface 260 may be provided to the client devices 120.

As described above, the software application 260 receives a schedule 210 of sporting events (e.g., from a third party via the one or more networks 150). The software application 260 then provides functionality for an operator to set point spreads 230 for those sporting events using the operator user interface 260. The schedule 210 and the points spreads 230 are output to users via the client user interface 220, which provides functionality for user to make selections 250 predicting the outcomes of the sporting events. The software application 260 also receives the results 270 of the sporting events (e.g., from the same third party that provided the schedule 210). Comparing the results 270 of the sporting events to the user selections 250, the software application 260 can determine and output user results 290 indicating whether the user has correctly predicted the outcomes of the sporting events. The schedule 210, the point spreads 230, the user selections 250, the results 270, and the user results 290 may be stored in the database 280.

The system 200 includes two novel features that can be employed separately or in combination. The first feature is that point spreads may be listed as whole integers, creating the possibility that the outcome of the sporting event will match the point spread exactly and neither team will win the sporting event after adjusting for the point spread. The point spread may even be listed as a small range (e.g., a 2- to 3-point range). Participants are therefore given the option to select that the outcome of the sporting event will match the point spread exactly (sometimes referred to as a "push").

Because the point spread rarely matches the outcome of a sporting event exactly, the odds of winning any wager that the outcome will match the point spread are lower, but the payoff for being correct is much higher than the payoff for correctly selecting that one of the teams will cover the point spread. Similar to slot machines, the system 200 allows participants to make a series of relatively small wagers. Also similar to slot machines, a small possibility exists for a large payout.

The second feature is that, by selecting the outcome of a number of sporting events, the participant is in effect wagering on the outcome of each selected sporting event individually and each combination of the selected sporting events. Mathematically, for n selections, the system 200 enables the user to make $$\sum_{k=1}^{n}\binom{n}{k}$$

separate wagers, where $$\binom{n}{k}$$

is the binomial coefficient. In other words, when a user makes n selections, the system 200 enables the user to make a separate wager on each selection, each group of two selections, etc., concluding with a single group of n selections.

Figure 3:
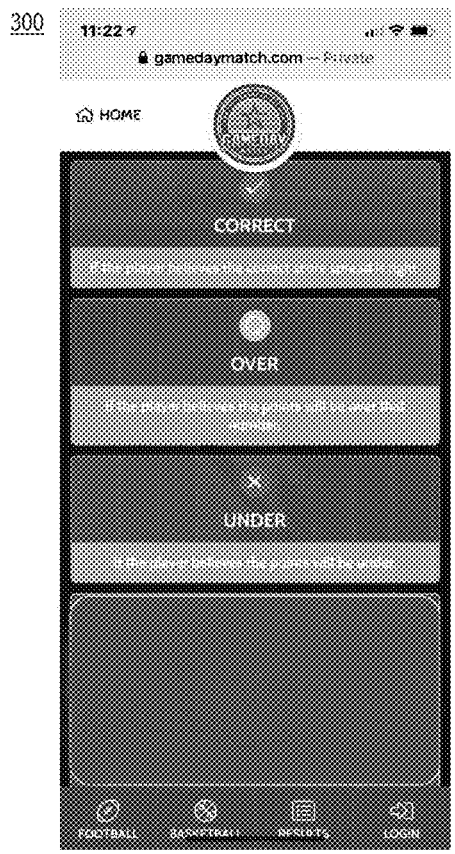
FIG. 3 is an explanation view output via the client user interface according to an exemplary embodiment.

To use an example, a participant may make the following three selections: the New York Knicks (+1 or +2) over the Charlotte Hornets, the Philadelphia 76ers (−11 or −12) over the Golden State Warriors, and the New Orleans Pelicans (−7 or −8) over the Cleveland Cavaliers. In that example, the participant is making seven separate wagers:

Single-game wager (1 Single): the New York Knicks (+1 or +2) over the Charlotte Hornets Single-game wager (1 Single): the Philadelphia 76ers (−11 or −12) over the Golden State Warriors Single-game wager (1 Single): the New Orleans Pelicans (−7 or −8) over the Cleveland Cavaliers Two-game parlay (1 Double): the New York Knicks (+1 or +2) over the Charlotte Hornets and the Philadelphia 76ers (−11 or −12) over the Golden State Warriors Two-game parlay (1 Double): the New York Knicks (+1 or +2) over the Charlotte Hornets and the New Orleans Pelicans (−7 or −8) over the Cleveland Cavaliers Two-game parlay (1 Double): the Philadelphia 76ers (−11 or −12) over the Golden State Warriors and the New Orleans Pelicans (−7 or −8) over the Cleveland Cavaliers Three-game parlay (1 Treble): the New York Knicks (+1 or +2) over the Charlotte Hornets, the Philadelphia 76ers (−11 or −12) over the Golden State Warriors, and the New Orleans Pelicans (−7 or −8) over the Cleveland Cavaliers FIG. 3 is an explanation view 300 output via the client user interface 220 according to an exemplary embodiment.

As shown in the view 300, a user selection 250 that the favorite will win the sporting event by more than the point spread 230 is referred to as an "over" in this embodiment. By contrast, a user selection 250 that the favorite will not win the sporting event by an amount equal to or greater than the point spread 230 is referred to as an "under." Additionally, a user may make a user selection 250 that the point spread 230 is "correct" and the result of the sporting event will be at (or within the range of) the point spread 230.

Figure 4:
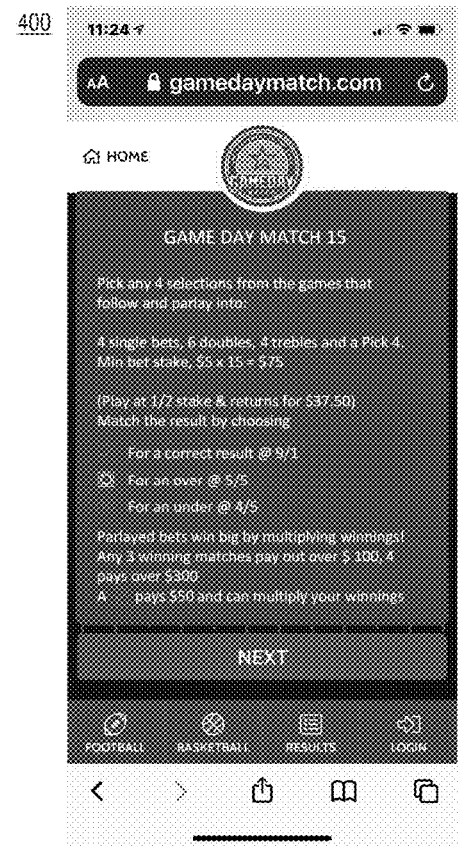
FIG. 4 is a payout view output via the client user interface according to an exemplary embodiment.

FIG. 4 is a payout view 400 output via the client user interface 220 according to an exemplary embodiment.

As shown in the payout view 400, making four user selections 250 is, in effect, making fifteen separate wagers: each single game individually, six separate two-game parlays (referred to as "doubles" in this embodiment), four three-game parlays (referred to as "trebles" in this embodiment), and a four-game parley (referred to as a "pick 4" in this embodiment).

As also shown in the payout view 400, a participant's winnings may differ for different user selections 250. In the embodiment shown, each "over" pays $5 for each $5 wagered, each "under" pays $4 for each $5 wagered, and each selection that the point spread 230 is "correct" pays $45 for each $5 wagered. In each instance, the wager is also returned to the user if the user selection 250 is correct. For parlays, a participant's winnings may be calculated by multiplying the odds for each correct user selection 250. For example, a two-game parlay where the user selections are "over" (5/5) and "correct" (45/5) may pay $90 for each $5 wagered.

FIG. 5 is a schedule view 500 output via the client user interface 220 according to an exemplary embodiment.

As shown in FIG. 5, the schedule view 500 includes a schedule 210 of sporting events, each sporting event including a home team 512 and a visiting team 514. The schedule view 500 also includes a point spread 230 for each sporting event, selected by an operator using the operate user interface 260, which includes the team that is favored to win the game (i.e., the favorite 534) and number of points (or, in this embodiment, a range of points) by which the favorite 534 is expected to win the game. The view 500 provides functionality for a user to input a user selection 250 for each sporting event. As described above, a user selection may be an indication that the favorite 534 will win by more than the point spread 230 ("over"), that the favorite 534 will not win by an amount equal to or greater than the point spread 230 ("under"), or that the favorite 534 will win by the amount of the point spread 230 ("correct").

FIG. 6 is a user selection view 600 output via the client user interface 220 according to an exemplary embodiment.

As shown in FIG. 6, the example user selection view 600 includes four user selections 651 through 654.

Figure 7:
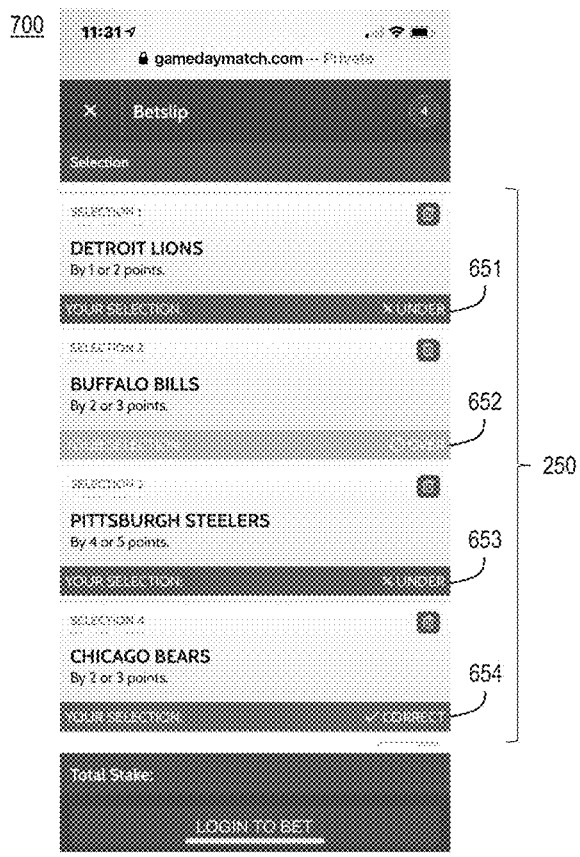
FIG. 7 is a betslip view output via the client user interface according to an exemplary embodiment.

FIG. 7 is a betslip view 700 output via the client user interface 220 according to an exemplary embodiment.

As shown in FIG. 7, the betslip view 700 includes each of the user selections 250, including the user selections 651 through 654. The betslip view 700 illustrates one of the key benefits of the system 200. As explained above, the user is actually making fifteen separate wagers. However, the user only needs to make four user selections 250 and follow the results 270 of four sporting events. Meanwhile, a small possibility exists for a large payout exists, for example if all four user selections 250 are correct. The potential payout is especially large, in this example, because the user selection 654 is that the point spread 230, which is only a 2-point range, is correct.

Figure 8:
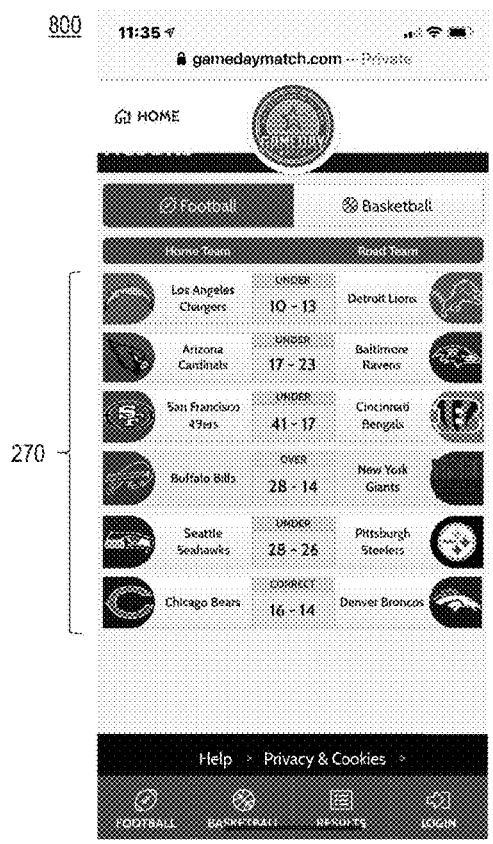
FIG. 8 is a results view output via the client user interface according to an exemplary embodiment.

FIG. 8 is a results view 800 output via the client user interface 220 according to an exemplary embodiment.

As shown in FIG. 8, the results view 800 includes the results 270 of the sporting events included in the schedule 210. The results view 800 may also include the user selections 250 and whether those user selections 250 were correct.

In addition to the fixed payouts described above, there are a number of different ways in which a participant's winnings may be calculated. In one embodiment, the wagers made by a user who predicts the outcome of a certain sporting event may be placed into a pool with all of the wagers made by users who predicted the outcome of that sporting event. By the same token, every potential parley bet during a certain time period may be pooled. For example, users making a two-team parlay regarding two specific sporting events may have that wager pooled and the users who make the accurate user selection 250 regarding both of those sporting events may win the pool.

In another embodiment, all of the wagers from all of the participants may be placed in a single pool. Regardless of whether the wagers using the system 200 are combined into a single pool or whether separate pools are made for each sporting event or combination of sporting events, a percentage of the total amount wagered may be retained by the operator before the remainder is distributed to the winners.

While preferred embodiments have been set forth above, those skilled in the art who have reviewed the present disclosure will readily appreciate that other embodiments can be realized within the scope of the invention. For example, the system 200 is described with reference to certain sporting events. However, the system 200 may provide a platform for wagering on any sporting event. Therefore, the present invention should be construed as limited only by any appended claims.

What is claimed is:

1. A method of providing a platform for wagering on sporting events, the method comprising:
receiving a schedule of sporting events;
providing functionality for an operator to set a point spread range for each of the sporting events, each point spread range including more than one integer;
providing functionality for users to make n user selections predicting the outcome of n sporting events, including functionality for users to predict that a team favored to win one of the sporting events will win by an amount greater than the point spread range, functionality to predict that the team favored to win will either lose the sporting event or win by an amount less than the point spread range, and functionality to predict that the team favored to win will win by an amount within the point spread range; and
generating $$\sum_{k=1}^{n}\binom{n}{k}$$

separate wagers from the n user selections, wherein the separate wagers include each unique combination of the n user selections.

2. The method of claim 1, wherein the functionality for users to make n user selections predicting the outcome of n sporting events comprises functionality for users to make more than one user selection predicting the outcome of more than one sporting event.

3. The method of claim 1, wherein generating $$\sum_{k=1}^{n}\binom{n}{k}$$

separate wagers from the n user selections comprises generating 15 separate wagers from 4 user selections.

4. A system for wagering on sporting events, the system comprising:
non-transitory computer readable media that stores
receiving a schedule of sporting events;

an operator user interface that provides functionality for an operator to set a point spread range for each of the sporting events, each point spread range including more than one integer;

a client user interface that provides functionality for users to make n user selections predicting the outcome of n sporting events, including functionality for users to predict that a team favored to win one of the sporting events will win by an amount greater than the point spread range, functionality to predict that the team favored to win will either lose the sporting event or win by an amount less than the point spread range, and functionality to predict that the team favored to win will win by an amount within the point spread range; and a server that generates $$\sum_{k=1}^{n}\binom{n}{k}$$

separate wagers from the n user selections, wherein the separate wagers include each unique combination of the n user selections.

5. The system of claim 4, wherein the functionality for users to make n user selections predicting the outcome of n sporting events comprises functionality for users to make more than one user selection predicting the outcome of more than one sporting event.

6. The system of claim 4, wherein generating $\Sigma_{k=1}\binom{k}{k}$ separate wagers from the n user selections comprises generating 15 separate wagers from 4 user selections.

7. Non-transitory computer readable storage media (CRSM) storing instructions that, when executed by a hardware computer processor, cause a system to:

receive a schedule of sporting events;

provide functionality for an operator to set a point spread range for each of the sporting events, each point spread range including more than one integer;

provide functionality for users to make n user selections predicting the outcome of n sporting events, including functionality for users to predict that a team favored to win one of the sporting events will win by an amount greater than the point spread range, functionality to predict that the team favored to win will either lose the sporting event or win by an amount less than the point spread range, and functionality to predict that the team favored to win will win by an amount within the point spread range; and generate $\Sigma_{k=1}^{n}\binom{n}{k}$ separate wagers from the n user selections, wherein the separate wagers include each unique combination of the n user selections.

8. The CRSM of claim 7, wherein the functionality for users to make n user selections predicting the outcome of n sporting events comprises functionality for users to make more than one user selection predicting the outcome of more than one sporting event.

9. The CRSM of claim 7, wherein generating $\Sigma_{k=1}^{n}\binom{n}{k}$ separate wagers from the n user selections comprises generating 15 separate wagers from 4 user selections.

* * * * *